Aug. 4, 1925.
W. A. LESTER
TIRE CHAIN
Filed Aug. 22, 1923
1,548,273
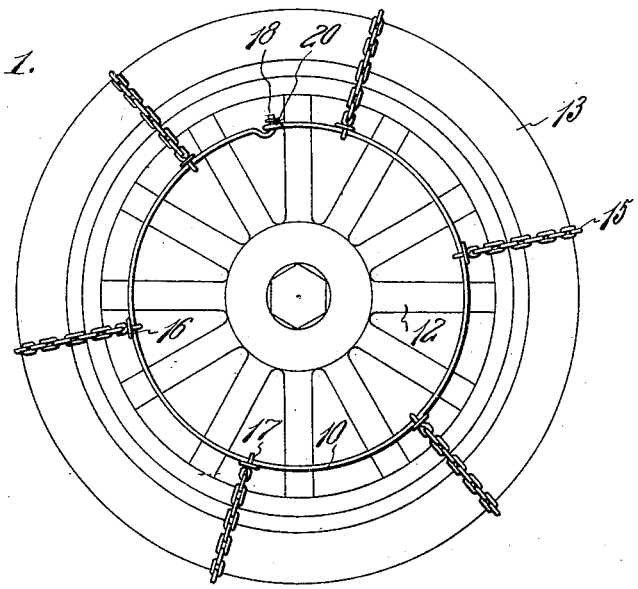
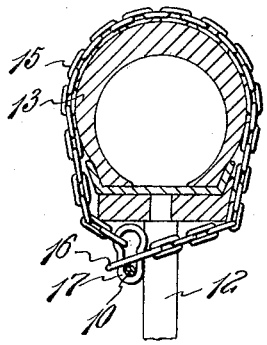
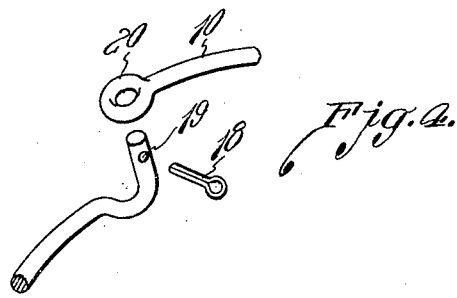
W. A. Lester
INVENTOR
BY Victor J. Evans
ATTORNEY
WITNESS:

Patented Aug. 4, 1925.

1,548,273

UNITED STATES PATENT OFFICE.

WARD A. LESTER, OF BOWLING GREEN, KENTUCKY, ASSIGNOR OF ONE-THIRD TO FRANK A. BRENDEL AND ONE-THIRD TO JACOB COY GUMM, BOTH OF BOWLING GREEN, KENTUCKY.

TIRE CHAIN.

Application filed August 22, 1923. Serial No. 658,804.

*To all whom it may concern:*

Be it known that I, WARD A. LESTER, a citizen of the United States, residing at Bowling Green, in the county of Warren and State of Kentucky, have invented new and useful Improvements in Tire Chains, of which the following is a specification.

The object of this invention is to provide an improved form of anti-skid device comprising a pluralty of independent chains adapted to be passed around a tire, without jacking up the car, and capable of attachment under practically all conditions.

A further object is to provide a plurality of chains to be attached independently of each other and adapted for connection with a ring encircling the hub, at a distance therefrom.

A further object is to provide in such a device a split ring and securing means on the ends thereof, and a plurality of chains each including a loop member and a ring, at the opposite ends of the chains, the loop being proportioned to enter and pass partly through the ring and to be engaged by the ring first named.

With the foregoing and other objects in in view, the invention consists in the novel construction and arrangement of elements described, illustrated and claimed, it being understood that modifications may be made within the scope of the claim, without departing from the spirit of the invention.

In the drawings, Figure 1 shows a wheel in side elevation, with the chains applied to the tire thereof; Figure 2 is a section transversely of the tire, with one chain in elevation; Figure 3 shows one of the chains, the central portion being broken away; Figure 4 is a detail view, in perspective, showing the manner of fastening the ends of the ring to which the chains are secured.

A split ring 10 is adapted to lie adjacent to the spokes of a wheel 12, this wheel carrying a tire 13 to which the anti-skid chains are to be applied. The chains 15 are wholly independent of each other, and any required number may be applied, under any conditions likely to be met with in practice, by simply passing the chains around the tire and wheel rim and fastening them as indicated below.

The chains 15 each include a ring 16 at one end and a pear shaped loop 17 at the other end, the loop 17 being proportioned to enter and pass partly through ring 16, and to be engaged by split ring 10. After the required number of chains has been thus engaged, the ring 10 is closed and secured by means of cotter pin 18 passing through eye member 19 which has previously been passed through eye member 20 on the opposite end of the split ring.

The device thus constructed is especially easy of application, and the securing means are positive in operation and easily released.

What I claim is:

In a device of the class described, independent chains adapted to pass transversely around a tire to be carried by a wheel, a loop connected with one end of each chain, the loop having a reduced end and being of pear shape, said reduced end being proportioned to pass through the opposite end of the chain to a point determined by the extent of the reduced portion and to project beyond said opposite end, and means for connecting and securing all of the projecting ends of the chains, in one operation.

In testimony whereof I affix my signature.

WARD A. LESTER.